Figure 1:
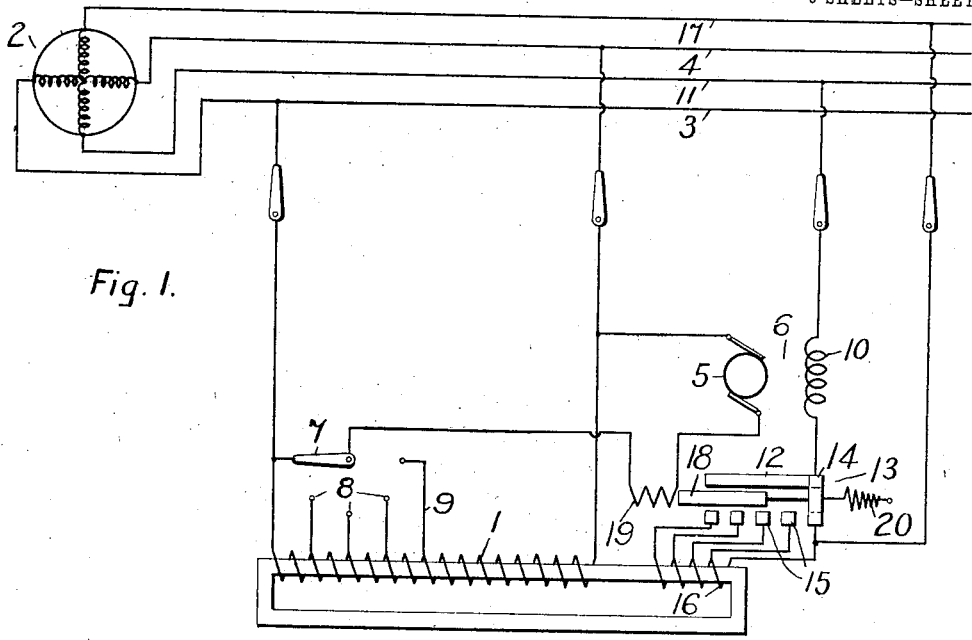

No. 839,935. PATENTED JAN. 1, 1907.
B. G. LAMME.
PHASE ADJUSTING MEANS FOR ALTERNATING CURRENT MOTORS.
APPLICATION FILED FEB. 6, 1905.

6 SHEETS—SHEET 1.

WITNESSES:
Fred. H. Miller
Otto S. Schairer

INVENTOR
Benj. G. Lamme
BY
Wiley Belcam
ATTORNEY

No. 839,935.　　　　　　　　　　　　　　　　PATENTED JAN. 1, 1907.
B. G. LAMME.
PHASE ADJUSTING MEANS FOR ALTERNATING CURRENT MOTORS.
APPLICATION FILED FEB. 6, 1905.

WITNESSES:
Fred. H. Miller
Otto S. Schairer.

INVENTOR
Benj. G. Lamme
BY
Wesley G. Carr
ATTORNEY

No. 839,935. PATENTED JAN. 1, 1907.
B. G. LAMME.
PHASE ADJUSTING MEANS FOR ALTERNATING CURRENT MOTORS.
APPLICATION FILED FEB. 6, 1905.

6 SHEETS—SHEET 3.

WITNESSES:
Fred. H. Miller
Otto S. Schairer.

INVENTOR
Benj. G. Lamme
BY
Wesley G. Carr
ATTORNEY

No. 839,935. PATENTED JAN. 1, 1907.
B. G. LAMME.
PHASE ADJUSTING MEANS FOR ALTERNATING CURRENT MOTORS.
APPLICATION FILED FEB. 6, 1905.

6 SHEETS—SHEET 4

WITNESSES:
Fred. H. Miller
Otto S. Schairer

INVENTOR
Benj. G. Lamme
BY
ATTORNEY

No. 839,935.

PATENTED JAN. 1, 1907.

B. G. LAMME.
PHASE ADJUSTING MEANS FOR ALTERNATING CURRENT MOTORS.
APPLICATION FILED FEB. 6, 1905.

6 SHEETS—SHEET 5.

WITNESSES:
Fred. H. Miller
Otto S. Schairer.

INVENTOR
Benj. G. Lamme
BY
[signature]
ATTORNEY

No. 839,935. PATENTED JAN. 1, 1907.
B. G. LAMME.
PHASE ADJUSTING MEANS FOR ALTERNATING CURRENT MOTORS.
APPLICATION FILED FEB. 6, 1905.

6 SHEETS—SHEET 6.

WITNESSES:
Fred. H. Miller
Otto S. Schairer.

INVENTOR
Benj. G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

PHASE-ADJUSTING MEANS FOR ALTERNATING-CURRENT MOTORS.

No. 839,935.   Specification of Letters Patent.   Patented Jan. 1, 1907.

Application filed February 6, 1905. Serial No. 244,475.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Phase-Adjusting Means for Alternating-Current Motors, of which the following is a specification.

My invention relates to alternating-current motors of the commutator type of construction; and its object is to provide improved means for supplying energy to such motors from multiphase sources, whereby the proper phase relations of the currents traversing the armature and field-magnet windings for the most efficient and economical operation may be secured.

In general, motors of the commutator type of construction, if properly designed, may be operated efficiently by means of alternating currents, provided the currents in the armature and field-magnet windings reverse simultaneously, or nearly so. If the armature and field circuits of a motor of the commutator type having laminated magnetic circuits are supplied with alternating electromotive forces differing ninety degrees in phase, the currents in the armature and field-magnet windings may reverse nearly simultaneously. This is true because the current supplied to the field-magnet winding may be largely a magnetizing or wattless current that lags nearly ninety degrees behind the electromotive force impressed upon that circuit, while the armature-circuit may be and is ordinarily made with but little self-induction, so that the current in this circuit lags but little behind the electromotive force impressed upon it. It is obvious, then, that if the electromotive forces applied to the two circuits differ ninety degrees in phase the currents in the armature and field-magnet circuits differ but little in phase. It has been found in practice, however, that in order to obtain minimum armature-current for a given torque it is necessary that the currents in the armature and field circuits be more nearly coincident in phase than is the case if only the differences of the power factors of the circuits are depended upon to produce the proper phase relations. The insufficiency of the power-factor conditions of the circuits is partially due to the fact that the armature-circuit cannot be made entirely non-inductive. Moreover, when constant voltages are applied to the armature and field-magnet windings the amount of current in the field-magnet winding, as well as its phase relation with respect to the electromotive force applied to the winding, remains practically constant, even under variations in the load upon the motor; but the amount of current in the armature-circuit varies according to the work which the motor is doing, and the phase relations of this current with respect to the electromotive force applied to the armature-winding varies as the amount of current varies. Thus the phase relations of the currents in the armature and field-magnet windings with respect to each other vary as the work done by the motor varies. With no load on the motor—i. e., with but small currents flowing in the armature-circuit—the phase relations may be reasonably close to what is desired; but as load is placed on the motor the phase relations of the armature and field currents with respect to each other change.

It is the purpose of this invention to provide means for effecting the proper adjustment of the phase relations of the armature and field currents in order to obtain minimum armature-current for a given torque regardless of the load upon the motor. This may be done by either of two methods—viz., by varying the phase relation of the electromotive force applied to one circuit with respect to that applied to the other in accordance with changes in load or by altering the phase relations of the current and electromotive force in the armature-winding or in the field-magnet winding, or in both.

My invention also provides means for deriving electromotive forces differing ninety degrees in phase from a three-phase source of energy and applying them, respectively, to the armature and field-magnet circuits of a motor of the type described. This may be done by connecting an autotransformer-winding between two terminals of a three-phase source and by connecting one terminal of one of the motor-circuits to the third terminal of the source and the other terminal to the middle point of the autotransformer-winding, the other motor-circuit being supplied from the autotransformer-winding.

With this arrangement the electromotive force applied to the circuit, the terminals of which are connected, respectively, to one supply-conductor and the middle point of the transformer-winding, is substantially .867 of the potential difference existing between the other two supply-conductors, and the electromotive forces applied to the field-magnet and armature windings, respectively, differ in phase by ninety degrees. A variation or deviation from an exact quadrature relation may be obtained if circuit connection is made to other than the middle point of the autotransformer-winding.

My invention is illustrated in the accompanying drawings, in which—

Figure 2:
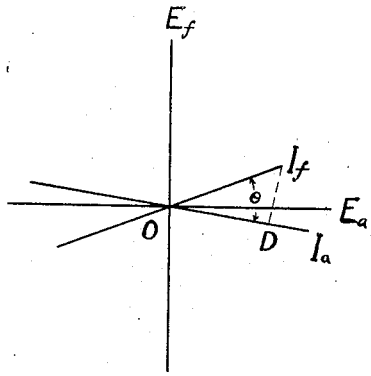
Figure 3:
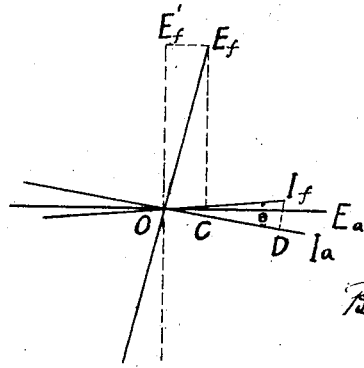
Figure 6:
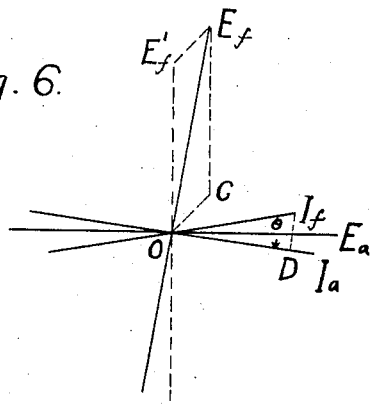
Figure 7:
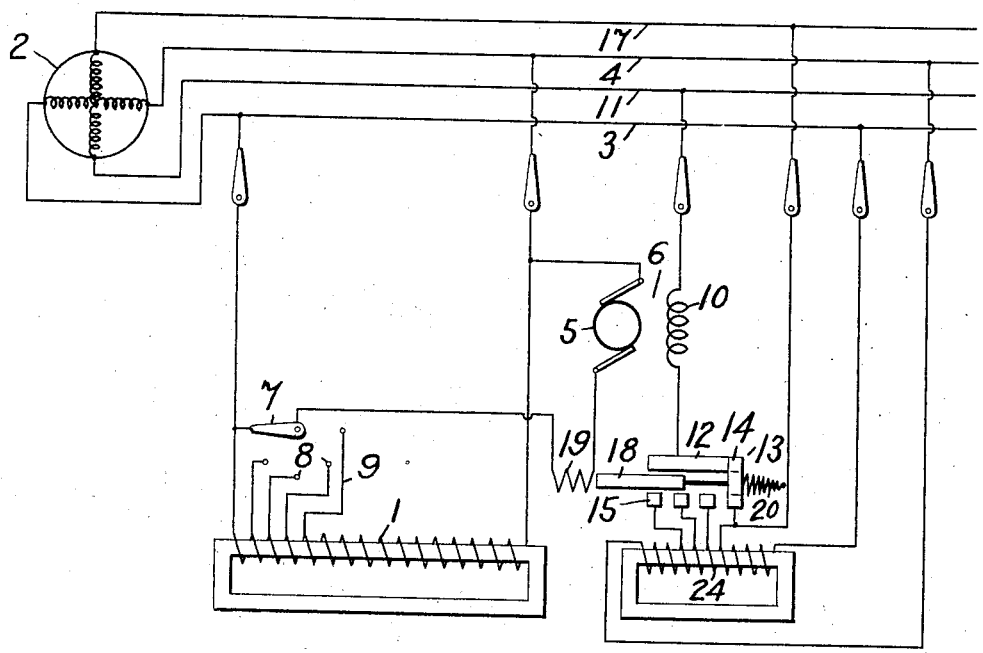
Figure 8:
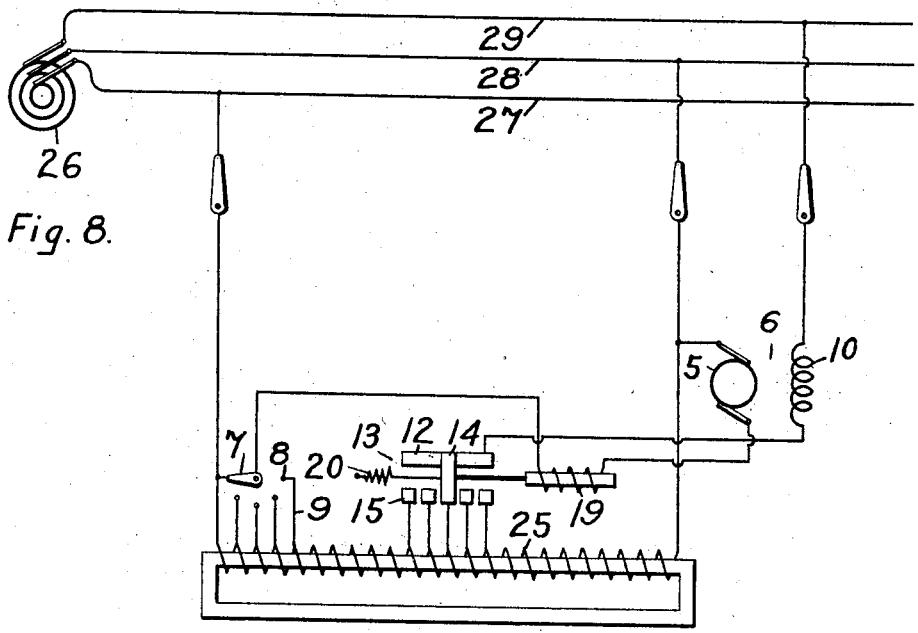
Figure 9:
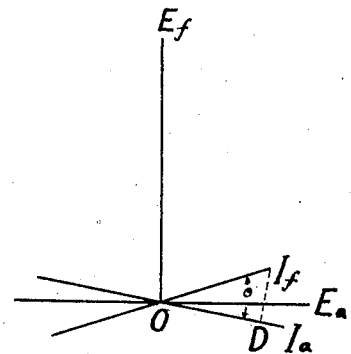
Figure 10:
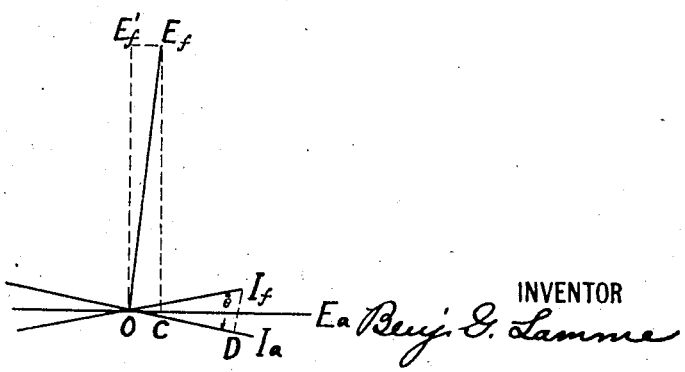
Figure 11:
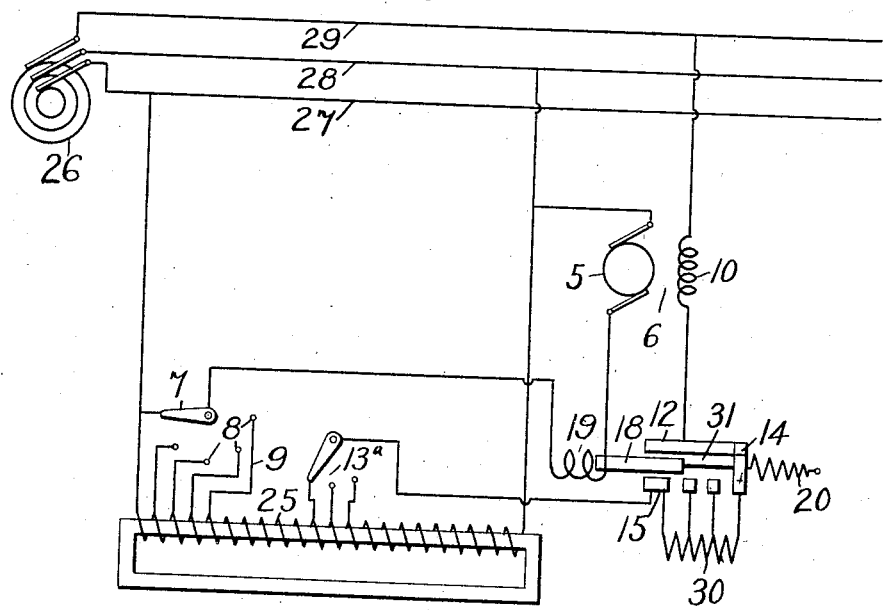
Figure 12:
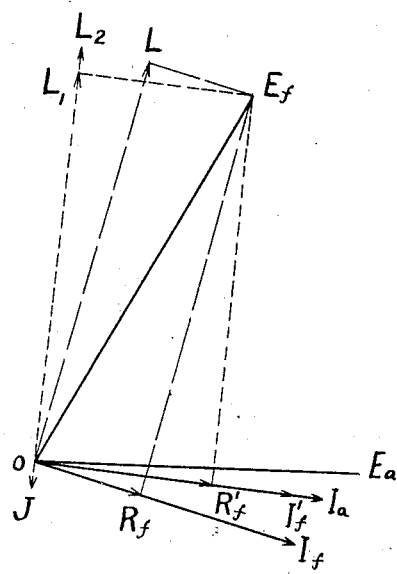
Figure 13:
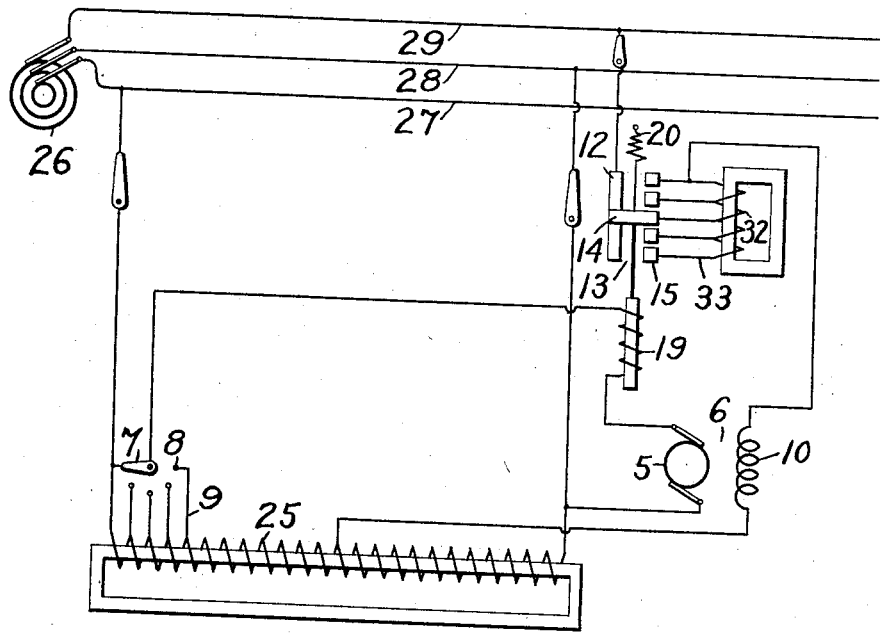
Figure 14:
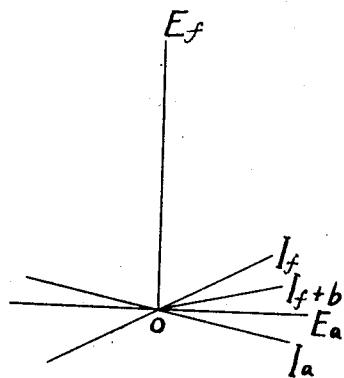

Figure 1 illustrates diagrammatically a motor supplied from a two-phase source which is provided with a specific type of phase-adjusting means. Figs. 2 and 3 are vector diagrams illustrative of the approximate phase relations of the currents and electromotive forces of the motor shown in Fig. 1. Figs. 4, 5, and 7 are diagrammatic views illustrating modifications of my invention as employed in connection with two-phase systems. Fig. 6 is a vector diagram of the approximate phase relations as they may occur in the modification of Fig. 5. Fig. 8 illustrates diagrammatically a motor which is supplied from a three-phase source and which is also provided with means for effecting changes in the phase relations of the currents in the armature and field circuits. Figs. 9 and 10 are vector diagrams illustrative of the approximate phase relations of the currents and electromotive forces in the motor shown in Fig. 8. Fig. 11 illustrates diagrammatically still another modification of my invention as it may be employed in connection with a three-phase system, and Fig. 12 is a vector diagram of the approximate phase relations as they may occur in the motor of Fig. 11. Fig. 13 is a modification of the motor system shown in Fig. 8. Fig. 14 is a vector diagram of the approximate phase relations of the currents and electromotive forces in the motor of Fig. 13.

In Fig. 1 a transformer-winding 1 is supplied with energy from a suitable two-phase generator 2, having a closed-coil armature-winding, by means of conductors 3 and 4. Armature 5 of motor 6 derives its energy from the transformer-winding 1, a suitable means for varying the electromotive force applied to the armature-winding comprising a movable arm 7, adapted to engage contact-terminals 8, which are connected with spaced points in the transformer-winding 1 by means of leads 9.

One terminal of the field-magnet winding 10 of the motor 6 is connected to supply-conductor 11 and the other terminal is connected to a suitable conducting-strip 12 of a regulating device 13. A brush 14 is adapted to make sliding contact with the conducting-strip 12 and to engage contact-terminals 15, which are connected to suitable spaced points in a winding 16, which is placed in the same magnetic circuit as the transformer-winding 1 and one terminal of which is connected to supply-conductor 17. The brush 14 is carried by the core 18 of a solenoid 19, which is connected in series with the motor-armature. A spring 20 is attached to the brush in any suitable manner for the purpose of resisting the pull exerted by the solenoid 19. If the current in the armature-circuit increases, the brush 14 is moved so as to cut into the field-circuit more of the winding 16, and if the current in the armature-circuit decreases the spring 20 causes part of the winding 16 to be cut out of the field-circuit.

It is of course understood that the controlling device 13 is only illustrative of any suitable means for varying the length of the winding 16 included in the field-circuit substantially in accordance with variations in the amount of current in the armature-circuit and that other devices for effecting this result may be employed within the scope of my invention.

An understanding of the approximate phase relations of the currents and electromotive forces in the armature and field-magnet windings under the different conditions may be obtained from a consideration of Figs. 2 and 3. In Fig. 2 I have shown the approximate phase relations as they would occur in the motor if no auxiliary devices were employed for altering them. Lines $OE_a$ and $OE_f$ represent, respectively, the electromotive forces applied to the armature and field-magnet windings, and lines $OI_a$ and $OI_f$ represent, in direction, the currents in the armature and field-magnet windings. The angle $\theta$ represents the phase difference between the currents in the armature and field-magnet windings. It will be observed that in Fig. 3 the phase of the electromotive force $OE_f$ is indicated as shifted from the relation shown in Fig. 2 with respect to the electromotive force $OE_a$, since when a part or the whole of the transformer-winding 16 is included in the field-circuit the electromotive force $OE_f$, which is applied to the field-magnet winding, is the resultant of the electromotive force $OE'_f$, that is derived from the supply-circuit and the electromotive force $OC$, that is derived from the winding 16, the electromotive force $OC$ being in phase with the electromotive force $OE_a$. The angle $E_fOI_f$ is determined by the power factor of the field-circuit and remains the same in both cases. As above noted, the angle $E_fOE_a$, in Fig. 3 is less than the corresponding angle in Fig. 2, and hence the angle $\theta$ in Fig. 3 is less than the angle $\theta$ in Fig. 2. The field magnetism being proportional to and in phase with the field current, the line $OI_f$ may represent the phase direction of the field magnetism as well as that of the field-current.

The torque exerted by the armature of such a motor as is hereinbefore described is proportional to the product of the armature-current $OI_a$ and that component OD of the field magnetism which is in phase with the armature-current. It is evident that when the angle $\theta$ is a minimum the component OD is a maximum, and when the component OD is a maximum—i. e., when the field and armature currents are most nearly in phase—the power factor of the motor is a maximum and the armature-current is a minimum for that particular torque.

It will be understood that the electromotive force represented by the line OC may be chosen of such magnitude that the resultant electromotive force $OE_f$ and the corresponding current $OI_f$ may be shifted to bring the field-magnet current $OI_f$ and the armature-current $OI_a$ into phase with each other—i. e., so that the lines $OI_f$ and $OI_a$ will coincide in direction. While this is a desirable condition for operation and, as just stated, may be attained if the component forces are properly chosen, I have indicated relations that only approximate this condition, for the reason that such approximation may be more conveniently and clearly illustrated.

Various modifications of my invention, such as are shown in Figs. 4, 5, and 7, may be found of use in special cases, though in general not so economical in construction. In Fig. 4 the winding 16 is the secondary winding of a separate transformer 21 from that which supplies energy to the armature-winding, the primary winding 22 of which is connected between the same supply-conductors 3 and 4 as the transformer-winding 1. The approximate phase relations of the currents and electromotive forces in the armature and field-magnet windings of Fig. 4 are shown in Fig. 3.

In Fig. 5 the winding 16 of an autotransformer 23 is connected to supply-conductors 4 and 17, between which is an electromotive force that differs in phase from that which is applied to the armature-circuit and also from that which is supplied to the field-magnet circuit. The approximate phase relations are shown in Fig. 6, in which the electromotive force $OE_f$, impressed upon the field-magnet winding, is the resultant of the electromotive force $OE'_f$ applied to the field-circuit and the electromotive force OC derived from the winding 16.

An autotransformer-winding 24 may also be connected between the same supply-conductors 3 and 4 as is the main transformer-winding 1, and the points of connection of the field-magnet winding therewith may be shifted in accordance with variations in the amount of current traversing the armature-circuit, substantially as shown in Fig. 7.

In Fig. 8 a transformer-winding 25 is supplied with one phase of the energy from a three-phase source 26 through supply-conductors 27 and 28, and, as before, the armature 5 of motor 6 derives its energy from the transformer-winding. One terminal of the field-magnet winding 10 is connected to the third supply-conductor 29, and the other terminal is connected to a conducting-strip 12 of a regulating device 13, the details of which are similar to those shown in Fig. 1 and need not be further described. The contact-terminals 15, however, of the regulating device 13 are connected to spaced points in the transformer-winding 25 near its middle, and the phase relations of the electromotive forces applied to the armature and field-magnet windings are varied substantially in accordance with variations in the amount of current traversing the armature-circuit by the automatic variation of the position of the brush 14.

In Fig. 9 the reference characters are the same as those employed in the preceding vector diagrams and the approximate phase relations of the currents and electromotive forces in the armature and field-magnet windings illustrated in Fig. 8 are represented substantially as they occur when the terminal of the field-magnet winding 10 is connected to the middle point of the transformer-winding 25.

Fig. 10 shows the approximate phase relations of the currents and electromotive forces in the armature and field circuits as they may be altered by a change in the position of the brush 14 of Fig. 8, it being observed that the angle $\theta$ is less in Fig. 10 than in Fig. 9.

It may become desirable in practice to employ some very simple and comparatively inexpensive device, such as a rheostat, for effecting the desired changes in the phase relations of the motor-currents, particularly when the device is to be manually operated. In that event the electromotive force $OE_f$ applied to the field-magnet winding may be shifted by means already described to such a degree that the current $OI_f$ in the field-magnet winding will be nearly in phase with the current $OI_a$ in the armature-winding at any given load. If the load on the motor should then be changed, the phase relations of the electromotive force and current in the armature-circuit with respect to each other will change, as hereinbefore noted, and the phase relation of the current in the armature-circuit with respect to the current in the field-circuit will likewise change. By a variation of the amount of resistance in the field-circuit the phase relation of the field-current to its electromotive force may be changed so as to compensate or partly compensate for the change in the phase relation of the armature-current with respect to its electromotive force produced by the change in the load on the motor. Means for effecting such adjustments are illustrated in Fig. 11, in which the apparatus and circuits are the same as those illustrated in Fig. 8, except in the particulars which will be specifically mentioned. The amount of resistance 30 which is inserted in the field-circuit may be varied manually or it may be varied automatically by means of the same regulating device 13 which is employed for adjusting the point of connection of the field-magnet winding to the transformer-winding 25, it being only necessary to embody in this device details of any suitable character for varying the amount of resistance. As specifically illustrated, a manually-operated device 13ª is utilized for adjusting the point of connection of the field-magnet winding 10 to the transformer-winding 25, and an automatic device 31, like the device 13 of Fig. 8, is employed for varying the amount of the resistance 30 that is included in the field-magnet circuit.

Referring now to Fig. 12, if the adjustment of the electromotive forces of the two circuits causes the field-current $OI_f$ to lag behind the armature-current $OI_a$ the components of the field electromotive force $OE_f$ may be $OR_f$ to overcome resistance and $OL$ to overcome inductance. If the resistance component is increased to a length represented by the line $OR'_f$, the inductance component will become $OL_e$, and the field-current will be brought into phase with the armature-current $OI_a$ and may be represented by the line $OI'_f$.

The phase relations of the currents in the armature and field-magnet windings may be altered in a motor system of the general character shown in Fig. 8 by varying the self-induction of the field-circuit, and means for effecting this result are shown in Fig. 13. These means comprise an inductive winding 32, which is connected in series with the field-magnet winding 10 and subdivided by means of leads 33, that are connected to the contact-terminal 15 of a regulating device 13 of the general character of the one shown in Figs. 1 and 4.

The phase relations are shown in the vector diagram of Fig. 14, in which line $OI_f$ represents the current in the field-magnet winding when all of the inductive winding 32 is cut out of the circuit, and line $OI_{f+b}$ represents the current in the field-circuit when a part of the inductive resistance 32 is in series with the field-magnet winding.

By proper adjustment of the regulating device 13 it may be caused to so operate as to maintain the phase relations of the currents in the armature and field-circuits approximately constant regardless of variations in the amount of load with given voltages applied to the motor-windings.

While I have shown and described my invention as employed only for the purpose of altering the phase of the current in the field-magnet winding with respect to that of the current in the armature-winding, it is of course understood that, if it is desired so to do, the phase of the current in the armature-winding with respect to that of the current in the field-magnet winding may be adjusted in accordance with the same method and to meet the same or any other desired conditions.

The methods and some of the specific means for effecting adjustment of the phase relations of the currents in the armature and field-magnet windings hereinbefore set forth form the subjects-matter of an application, Serial No. 244,482, filed jointly by Clarence Renshaw and myself, application Serial No. 244,481, filed by Clarence Renshaw, and applications Serial Nos. 244,476 and 244,477, filed by myself, all of even date herewith.

I claim as my invention—

1. The combination with an alternating-current motor having armature and field-magnet windings and means for supplying electromotive forces differing approximately ninety degrees in phase respectively to said windings, of automatically-adjusted means for altering the phase relations of said electromotive forces.

2. The combination with an alternating-current motor having armature and field-magnet-windings and means for supplying to the respective windings single-phase electromotive forces that differ approximately ninety degrees in phase, of means exterior to the motor for bringing the currents in the armature and field-magnet windings approximately into phase with each other.

3. The combination with an alternating-current motor having armature and field-magnet windings and means for supplying to the respective windings single-phase electromotive forces that differ approximately ninety degrees in phase, of means for altering the phase relations of said electromotive forces in order to bring the currents in the armature and field-magnet windings approximately into phase with each other.

4. The combination with an alternating-current motor having armature and field-magnet windings and means for supplying electromotive forces differing approximately ninety degrees in phase respectively to said windings, of means for varying the phase relations of the said electromotive forces approximately in proportion to the variations in the amount of current traversing the armature-circuit.

5. The combination with an alternating-current motor having armature and field-magnet windings and means for supplying electromotive forces differing approximately ninety degrees in phase respectively to said windings, of means for varying the phase relations of the said electromotive forces substantially in accordance with variations in the torque exerted by the motor.

6. The combination with an alternating-current motor having armature and field-magnet windings and means for supplying electromotive forces differing approximately ninety degrees in phase respectively to said windings, of means for varying the phase relations of the said electromotive forces approximately in proportion to the amount of current traversing the armature-circuit, comprising a controlling device responsive to variations in the amount of current in the armature-circuit.

7. The combination with an alternating-current motor having an armature-winding of low self-induction and a field-magnet winding of high self-induction, and means for supplying electromotive forces differing approximately ninety degrees in phase respectively to said windings, of means for varying the phase relations of the said electromotive forces approximately in proportion to the amount of current traversing the armature-circuit.

8. The combination with a source of three-phase alternating-current energy and an electric motor having armature and field-magnet windings, of an autotransformer-winding having its terminals connected between two of the supply-conductors from the source, means for connecting the armature-winding between any two points in said autotransformer-winding, and means for varying the connection of one terminal of the field-magnet winding with points near the middle of the autotransformer-winding, the other terminal of the field-magnet winding being connected to the third supply-conductor.

9. The combination with a source of three-phase alternating-current energy and an electric motor having armature and field-magnet windings, of an autotransformer-winding having its terminals connected between two of the conductors from the source, means for connecting the armature-winding between any two points in said autotransformer-winding, and means for automatically varying the connection of one terminal of the field-magnet winding with points located near the middle of the autotransformer-winding approximately in proportion to the variations in the amount of current traversing the armature-circuit, the remaining terminal of the field-magnet winding being connected to the third supply-conductor.

10. The combination with a source of three-phase alternating-current energy, of a transformer-winding connected between two of the supply-conductors from said source, and an electric motor having its armature-terminals connected to points in the transformer-winding and having its field-magnet winding connected between the third supply-conductor and approximately the middle point of the transformer-winding.

11. The combination with a source of three-phase alternating-current energy and an electric motor having armature and field-magnet windings, of a transformer-winding which derives energy from one phase of said source, means for connecting the armature-winding to said transformer-winding, and means for connecting one terminal of the field-magnet winding with the transformer-winding, the other terminal being connected to a supply-conductor.

12. The combination with an alternating-current motor having armature and field-magnet windings and means for supplying electromotive forces differing in phase respectively to said windings, of automatically-adjusted means for altering the phase relations of said electromotive forces.

13. The combination with an alternating-current motor having armature and field-magnet windings and means for supplying to the respective windings single-phase electromotive forces that differ in phase, of means exterior to the motor for bringing the currents in the armature and field-magnet windings approximately into phase with each other.

14. The combination with an alternating-current motor having armature and field-magnet windings and means for supplying to the respective windings single-phase electromotive forces that differ in phase, of means for altering the phase relations of said electromotive forces in order to bring the currents in the armature and field-magnet windings approximately into phase with each other.

15. The combination with an alternating-current motor having armature and field-magnet windings and means for supplying electromotive forces differing in phase respectively to said windings, of means for varying the phase relations of the said electromotive forces approximately in proportion to the variations in the amount of current traversing the armature-circuit.

16. The combination with an alternating-current motor having armature and field-magnet windings and means for supplying electromotive forces differing in phase respectively to said windings, of means for varying the phase relations of the said electromotive forces substantially in accordance with variations in the torque exerted by the motor.

17. The combination with an alternating-current motor having armature and field-magnet windings and means for supplying electromotive forces differing in phase respectively to said windings, of means for varying the phase relations of the said electromotive forces approximately in proportion to the amount of current traversing the armature-circuit, comprising a controlling device responsive to variations in the amount of current in the armature-circuit.

18. The combination with an alternating-current motor having an armature-circuit of low self-induction and a field-magnet circuit of high self-induction, and means for supplying electromotive forces differing in phase respectively to said windings, of means for varying the phase relations of the said electromotive forces approximately in proportion to the amount of current traversing the armature-circuit.

19. The combination with an alternating-current motor having armature and field-magnet windings and means for supplying electromotive forces differing in phase respectively to said windings, of automatically-adjusted means for obtaining predetermined phase relations of the currents in the armature and field-magnet windings.

20. The combination with an alternating-current motor having armature and field-magnet windings and means for supplying electromotive forces differing in phase respectively to said windings, of automatically-adjusted means for altering the phase relations of said electromotive forces in order to obtain predetermined phase relations of the currents in the armature and field-magnet windings.

21. The combination with an alternating-current motor having armature and field-magnet windings and means for supplying to the respective windings single-phase electromotive forces that differ in phase, of means external to the motor for producing closer phase coincidence of the currents in the armature and field-magnet windings than is normally due to difference in the power factors of said windings.

22. The combination with an alternating-current motor having armature and field-magnet windings and means for supplying to the respective windings single-phase electromotive forces that differ in phase respectively to said windings, of means external to the motor for producing closer phase coincidence of the armature and field magnetisms than is normally due to difference in the power factors of the armature and field-magnet windings.

23. The combination with an alternating-current motor having armature and field-magnet windings and means for supplying electromotive forces differing in phase respectively to said windings, of automatically-adjusted means exterior to the motor for adjusting the phase relations of the armature and field magnetisms.

24. The combination with an alternating-current motor having armature and field-magnet windings and means for supplying electromotive forces differing in phase respectively to said windings, of means exterior to the motor for adjusting the phase relations of the armature and field magnetisms in accordance with the variations in the amount of current traversing the armature-circuit.

25. The combination with a source of three-phase alternating-current energy and an electric motor having armature and field-magnet windings, of a transformer-winding connected between two supply-conductors from said source, the terminals of one of the motor-windings being connected to said transformer-winding and the other motor-winding being connected between an intermediate point in the transformer-winding and the third supply-conductor.

26. The combination with a source of three-phase alternating-current energy and an electric motor having armature and field-magnet windings one of which is supplied with energy from one phase of said source, of a transformer-winding that is connected to two of the supply-conductors from said source, the other motor-winding being connected between an intermediate point in said transformer-winding and the third supply-conductor.

27. The combination with an alternating-current motor having armature and field-magnet windings and means for supplying electromotive forces differing in phase respectively thereto, of means for varying the phase of the electromotive forces applied to one circuit with respect to that applied to the other circuit in accordance with variations of the phase relations of the current and electromotive force of the other circuit.

28. The combination with an alternating-current motor having armature and field-magnet windings and means for supplying electromotive forces differing in phase respectively thereto, of means for varying the phase of the electromotive force applied to one circuit in accordance with the amount of current traversing the other circuit.

29. The combination with an alternating-current motor having armature and field-magnet windings and means for supplying electromotive forces differing in phase respectively thereto, of means for varying the phase of the electromotive force applied to one circuit in accordance with the amount of current traversing the armature-circuit.

30. The combination with an alternating-current motor having armature and field-magnet windings, and means for supplying electromotive forces differing in phase respectively thereto, of means for varying the phase relations of the electromotive forces in accordance with variations in the phase difference between the electromotive force and current supplied to one of the windings.

31. The combination with an alternating-current motor having armature and field-magnet windings, and means for supplying electromotive forces differing in phase respectively thereto, of means for varying the phase relations of the electromotive forces in accordance with variations in the phase difference between the electromotive force and current supplied to the armature-winding.

32. The combination with a dynamo-electric machine having armature and field-magnet windings, of means external to the machine for producing closer phase coincidence of the currents in the armature and field-magnet windings than normally results from the difference in power factors of the windings.

33. The combination with a source of polyphase alternating current and a dynamo-electric machine having armature and field-magnet windings connected to the respective phases thereof, of means for varying the phase of the electromotive force applied to one of the windings substantially in accordance with variations of the current that traverses the other winding.

34. The combination with a source of polyphase alternating current and a dynamo-electric machine having armature and field-magnet windings connected to the respective phases thereof, of means for varying the phase of the electromotive force applied to the field-magnet winding substantially in accordance with variations of the current that traverses the armature-winding.

35. The combination with a source of polyphase alternating current and a dynamo-electric machine having armature and field-magnet windings connected to the respective phases thereof, of means for varying the phase of the electromotive force applied to one of the windings substantially in accordance with variations of the phase difference between the current and electromotive force of the other winding.

36. The combination with a source of polyphase alternating current and a dynamo-electric machine having armature and field-magnet windings connected to the respective phases thereof, of means for varying the phase of the electromotive force applied to the field-magnet winding substantially in accordance with variations of the phase difference between the current and electromotive force of the armature-winding.

In testimony whereof I have hereunto subscribed my name this 3d day of February, 1905.

BENJ. G. LAMME.

Witnesses:
 OTTO S. SCHAIRER,
 BIRNEY HINES.